May 28, 1940.    A. J. METZ, SR    2,202,665
MOTOR VEHICLE CONSTRUCTION
Filed March 22, 1938    7 Sheets-Sheet 5

Inventor:
Anthony J. Metz, Sr.
By John W. Watson
Atty.

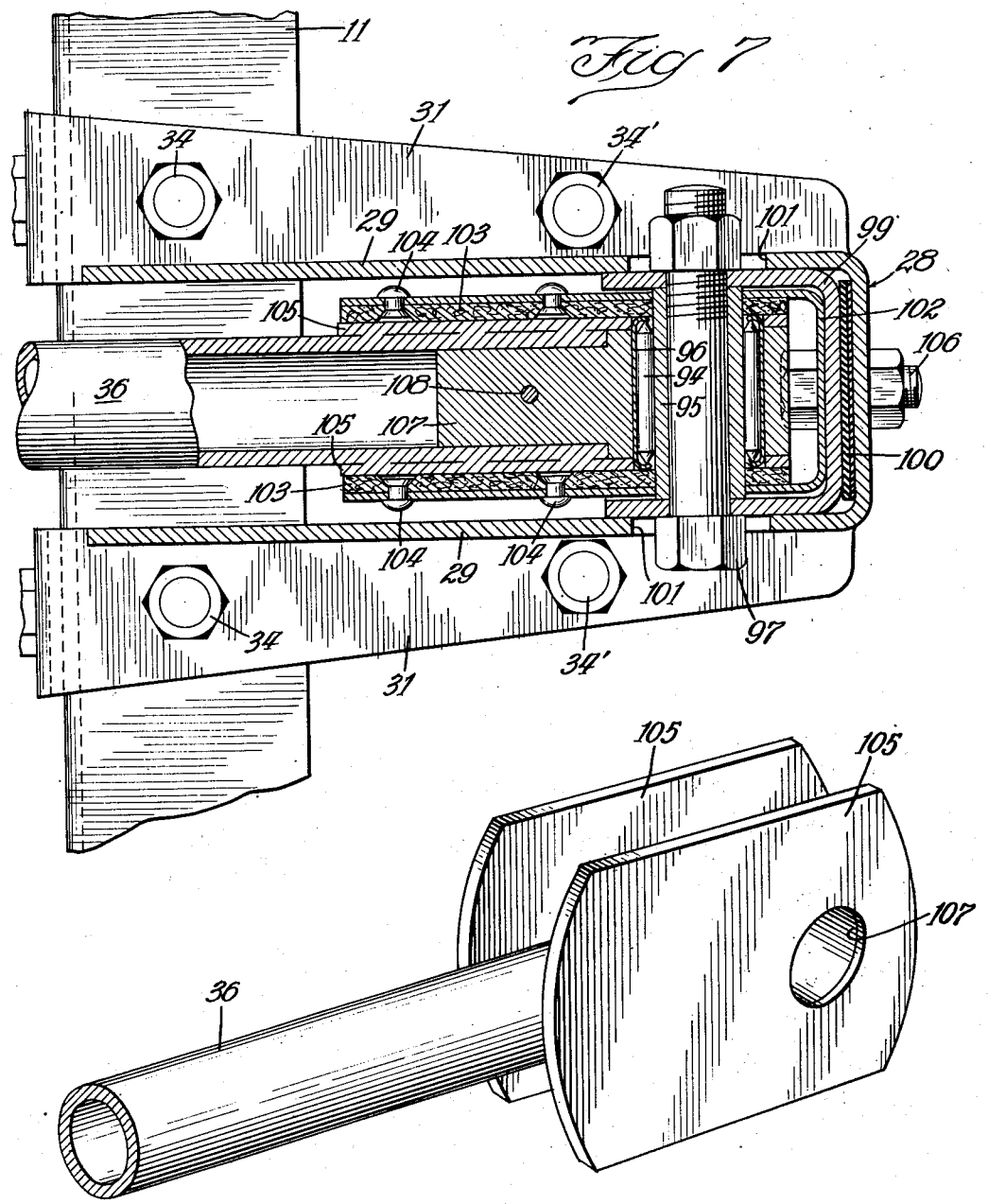

May 28, 1940.  A. J. METZ, SR  2,202,665
MOTOR VEHICLE CONSTRUCTION
Filed March 22, 1938     7 Sheets-Sheet 7
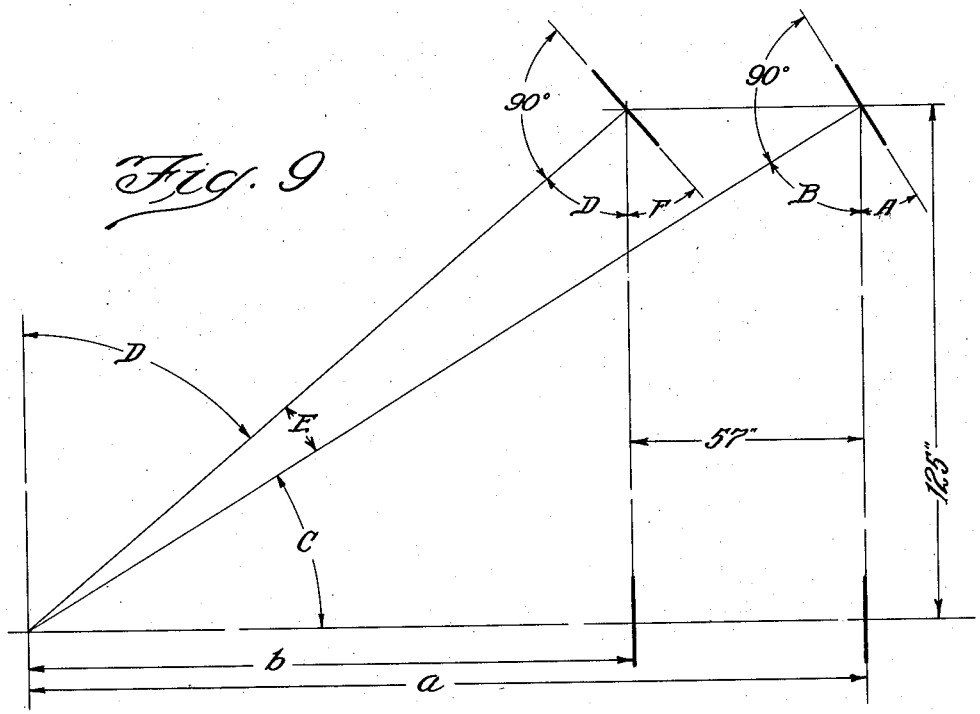
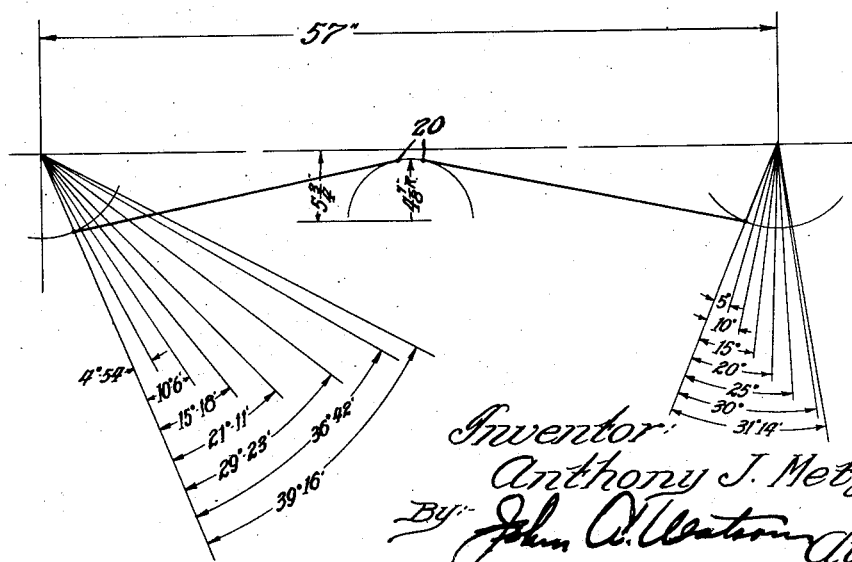

Patented May 28, 1940

2,202,665

UNITED STATES PATENT OFFICE 2,202,665

MOTOR VEHICLE CONSTRUCTION

Anthony J. Metz, Sr., Davenport, Iowa

Application March 22, 1938, Serial No. 197,441

22 Claims. (Cl. 280—96.2)

This invention relates primarily to the construction of the steering or dirigible end of automotive and other vehicles and, more particularly, to the wheel mounting and securing arrangements, to the spring mounting and suspension, and to the steering mechanism and the connections thereof between the fixed portions of such mechanism, such as the steering column and pitman, and the dirigible wheels and related parts. In certain aspects the invention is related to and includes features of improvement upon and certain features generic to the invention or inventions disclosed in my copending application Serial Number 140,463, filed May 3, 1937. Certain features of the invention are as applicable to non-dirigible wheels as to dirigible wheels, as will become apparent.

The ordinary design of automotive vehicle front ends, that is, the dirigible or steering parts, whether front or rear ends, is a complicated and tedious task owing to the multitude of variable factors which must be taken into account and most, if not all, of which are more or less mutually interdependent to the extent that variations in any one factor may affect all of the other factors. In the so-called Ackerman principle of steering or arrangement of front axle or end construction as improved and now commonly used, the front wheels are mounted on individual pivots called king pins but are connected by a tie rod and to the steering wheel through the steering column, in such manner as will permit the wheels to be moved or steered together in order to turn the vehicle. In order to attempt to keep the wheels running true with respect to the center of the turning circle, the Ackerman principle requires that the spindle arms, which connect the tie rods and wheels, be set obliquely inward from the wheels, and the angles and distances must be fixed with a precision not always observed. Each wheel is also given caster, camber and toe-in.

Caster, of course, is used to throw the center of road contact of the wheel behind the effective center of pivoting or swinging of the wheel in turning the vehicle, while the wheel is given camber to bring the center of road contact of the wheel as nearly directly under the point of wheel pivot (king pin) loading as is reasonably possible, and toe-in is used cooperatively to correct for camber and caster effects, for control over road conditions and to produce stability of direction and control under normal operation. Each of these factors may exert a definite influence upon each of the others and all play an important part in the steering of the ordinary vehicle.

The complications attendant upon the introduction of the factors of caster, camber and toe-in have been appreciated for a long time but efforts to avoid them have been more or less unsuccessful. When there is too much caster the wheels are difficult to turn from a straight path and when there is too little caster there may be weaving and wandering or shimmy. If the camber is too much, too little or unequal as between the wheels the tires are worn unevenly and undesirably, and steering difficulties are encountered, and, if the toe-in is not correct similar troubles ensue. The problems have not been simplified but rather have been rendered more and more complex with the introduction of larger tires with less air pressures, the advent of independently sprung wheels, both of which look primarily to the comfort rather than the safety of the vehicle occupants, and the use of higher and higher vehicular speeds. Safety factors, particularly those dependent upon the human equation, the vehicle driver, have not kept pace with those problems.

Among the steering problems is that of turning radius, fundamentally that angle in the steering geometry which holds each front wheel tangent to the circle on which it should travel in making a turn. Since the front axle is not mounted on a center pivot and the front wheels do not turn with the axle, as in a wagon, but are independently pivoted on king pins or the like, in order to maintain the wheel axle axes coincident with radii of the turning circle, the wheels must be turned at differential rates so that the inside wheel, on the turn, will swing through a greater angle for each given increment of angular movement of the outside wheel, thereby to maintain the proper turning radius. This problem is affected by each of the factors of camber, caster, and toe-in and, in turn affects those factors, so that each factor may be said to be more or less inextricably dependent upon each of the other factors in the ordinary design.

The complexity of front end design is further complicated by the spring design and suspension, by tire construction and inflation and by other factors and conditions as will be appreciated. The character of the spring, its location and points of connection may vitally affect the steering particularly under operating conditions. When one of the wheels strikes an obstruction or a depression in the road, the deflection of the spring may permit a considerable momentary change in the camber and toe-in or may even (temporarily at least) create an unsafe condition including undue driver fatigue. Weakened or weakening springs as well as shifting springs, wear in king pins and shackles and other parts, bent or displaced axles, and various other troublesome conditions, a large part of which may be attributed to the complexity of present designs of dirigible front ends, also play their part in affecting the steering through changes in camber, caster, and toe-in and other factors.

Among the numerous factors to be considered in designing the dirigible parts such as the front end of an automobile are a number heretofore disregarded or neglected. When, for instance, a member and its point of reception of forces are so designed and located that stressing forces encountered may operate with an effective leverage or leverages, the loading or stresses on the member and other members associated with it are multiplied, and, perhaps, differ directionally from the direction of the initial forces. There must be compensation for these leverage effects otherwise they would be transmitted to various parts of the front end including the steering mechanism and would seriously affect the steering and general roadability of the car. And in ordinary designs compensation is provided to a small extent initially by tight bearings and other connections, by high steering ratios and by the provision of the usual shock absorbers, etc., which decrease the roadability of the car, but when wear occurs, even this small compensation is lost. The correct solution to the problem, however, lies largely in the elimination of the effective leverages or in the reduction of those leverages to as near zero values as possible.

Other forces commonly overlooked are those forces which arise through unbalanced rotating parts or through the application of unbalanced forces to rotating parts. For example, when a tire or a wheel is out of balance (dynamic or static) or when the brake drum is so located that its reaction effects work at a leverage angle, the forces resulting therefrom create a condition where the wheel alignment and roadability may be considerably affected. In the case of a brake drum location of such character, an application of the brakes may cause the vehicle to 'duck' to one side or the other, and may cause or tend to cause wheel 'tramp' or 'shimmy' as well as produce other undesirable results. These various force-leverage effects are quite unsatisfactory from the standpoint of driver comfort as well as from the aspect of safety.

Consequently, one of the primary objects of this invention is to minimize the problem of design of a vehicle front end construction in such ways and to such extent as will eliminate elaborate and expensive engineering calculations and construction, as will effect substantial economies in labor and material in manufacture and maintenance, as will provide increased strength or safety factors regardless of decrease in materials, parts, weight and labor, as will reduce road hazards, as will reduce or eliminate tire scuffing, cupping and other forms of wear, as will give easier steering with the elimination of practically all road shock, road tramp, shimmy, weaving or wandering, and, in short, as will improve and simplify the design, construction, operation and maintenance of a vehicle to a substantial degree.

Another important object is to provide a construction for the mounting, suspension and steering of the dirigible wheels of a vehicle wherein the moments of forces reacting against the wheel and through its mounting and suspension against and through the steering mechanism to the steering column and steering wheel, are resolved in such a manner as to bring them substantially to zero, with the result that such effects as wheel shimmy, tramp, pull, weaving and so forth are inhibited or cannot develop and with the further result that steering may be made easier as by reduction of the steering ratio to a lower ratio than with ordinary designs.

Another object is to provide a design wherein the ratio, proportions and arrangements of the parts is such that the reactive effects of weight mass, inertia force and the forces of resilient supporting means are self absorbing in the system to the end that no shock absorber action is necessary except when the velocity of the inertia forces in a vertical direction is relatively different from the velocity of the forces of the resilient supporting means.

Another object is to arrange, construct and mount the radius torque rods so that each may function at relatively low frequency and substantially as a mass, and so that in combination with the parallelogram linkage of the wheel mounting which has a relatively higher frequency and with the wheels themselves, a relationship is established which tends toward minimum displacement of the vehicle mass under rough or uneven road conditions. In this connection it may be noted that the invention contemplates the provision of radius torque rods of great length and located in a novel manner.

Another object is to provide a construction for the dirigible wheels of a vehicle wherein the wheels have an optimum amount of caster but wherein camber is rendered wholy unnecessary and toe-in is reduced substantially to zero.

Still another object is to provide a construction whereby the mean plane of rotation of each wheel is at all times perpendicular to the normal or mean horizontal plane of, say, the frame of the vehicle, even as the wheels rise and fall under varying loading or under varying road surface conditions, thereby to eliminate undesirable gyroscopic effects commonly encountered in most of the present designs.

A further object is to provide a steering mechanism whereby the wheel at the inside of any given turn will swing about its vertical pivot axis through arcs increasingly greater than the arcs through which the wheel at the outside of the turn swings so that the plane of rotation of each wheel will constantly lie tangent to the circle on which such wheel should run in making the turn and so that projections of the axes of rotation of the front wheels will at all times intersect one another substantially on a projection of the common axis of the rear wheels or, will intersect a line perpendicular to and intersecting a projection of the common axis of the rear wheels and perpendicular to a generally horizontal plane such as the mean plane of the vehicle frame.

Further objects are to provide simple and economical constructions by and through which the foregoing and other objects may be attained, the constructions including a special form and arrangement of floating wheel and wheel mounting, a special wheel spindle and turning pivot arrangement, a special spring suspension and mounting, special shock absorbing or damping devices, special steering mechanism, a special torque or radius arm, and various other important features mutually contributing to the desired results and ends to be reached.

Many other objects as well as the advantages and uses of the invention will become apparent and will be understood by those skilled in the art after reading the following description and claims and after viewing the drawings in which:

Fig. 7 is a horizontal section looking upward, taken substantially along the line VII—VII of Fig. 4, showing the details of construction of a damping mechanism or shock absorber, the scale being greater than that of Fig. 4.

Fig. 8 is a perspective view of one of the parallel arms of a wheel carrier structure showing part of one of the shock absorbing or motion damping mechanisms, and Figs. 9 and 10 are diagrammatic illustrations of the manner in which an automobile equipped with the invention may be steered.

Figure 1:
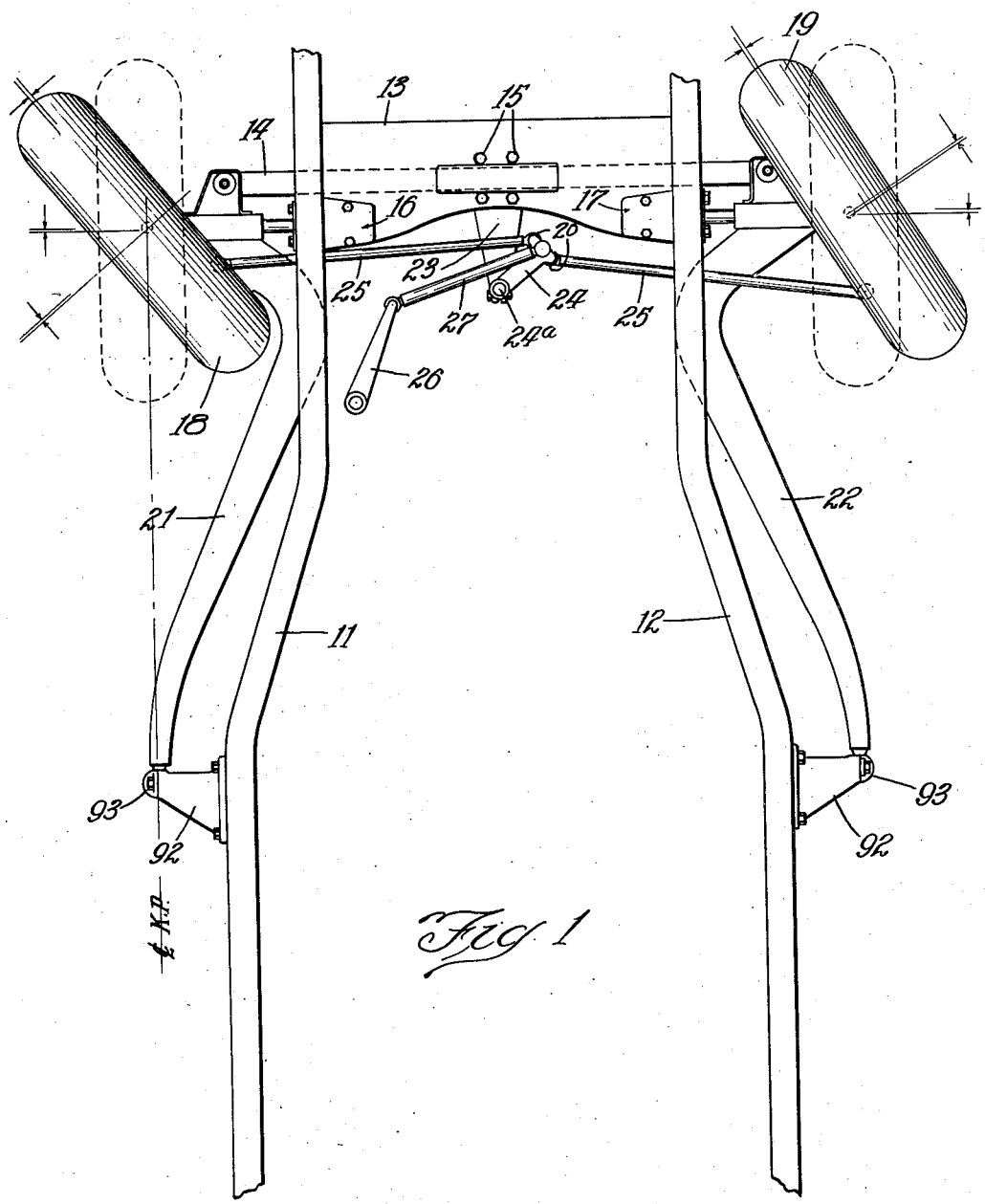
Fig. 1 is a top plan view, somewhat schematic in character, of the front or dirigible end of the chassis of an automobile, showing a preferred form of the invention applied thereto; the engine and other mechanism being omitted for the sake of simplification.

The portion of the chassis and running and steering gear shown in Fig. 1 includes longitudinally extending channel frame members 11 and 12 joined at their front end portions by a transverse member 13, a semi-elliptical spring 14 carried by a saddle member (not shown) attached to frame member 13 by U-bolts 15, wheel carrier means generally designated 16 and 17, wheels 18 and 19, radius rods 21 and 22, a rearwardly extending bracket 23, forming part of the spring saddle and carrying a swinging arm 24 pivoted thereto at 24a, tie rods 25 connected between the wheels 18 and 19 and arm 24, a pitman 26, and a drag link 27 connecting the pitman and arm 24. The construction and arrangement of the steering mechanism, insofar as the spindle arms, tie rods, pivot arm 24, bracket 23, drag link and locations of pivot connections between them are concerned, are so similar to the steering mechanism disclosed in said copending application that they may be considered identical. In the construction of the embodiment of the invention illustrated no axle as such is utilized, the parts referred to as the wheel carrier means 16 and 17 together with other mechanism and members serving the purposes of an axle as well as performing other functions. Each wheel carrier means is similar to the other, for which reason a description of either will suffice for both although there are certain relationships between them as will appear. The left front wheel carrier and its associated mechanisms have been illustrated and will be described, in detail.

Referring for the moment to Figs. 2, 3, 4 and 7 it will be noted that a generally U shaped bracket 28, the arms of which are formed as relatively deep vertically extending flanges 29, with relatively narrow horizontal flanges 31, has the ends of its arms formed or bent at right angles to the flanges 31 to provide portions 32 which lie against the outer face of the bottom of channel frame member 11. A sheet of rubber or other insulating material 33, may be disposed between the flanges 31 and 32 of the bracket, while bolts 34 secure the bracket 28 to the channel member. A steel filler sheet 30 is disposed between the flanges 31 and a rearwardly extending flange 13' on the transverse member 13, a sheet of rubber or other resilient material 33' overlies the flange 13', and a steel cap plate 33'' is superposed on the rubber and all are held together by the bolts 34 and 34'.

Pivotally supported by the bracket 28 and between the vertically depending flanges 29 thereof are a pair of arms 35 and 36, the upper of which is bent slightly at 37, for the purpose of permitting the same to swing upwardly through its maximum required distance without interference with the channel frame member. The arms 35 and 36 are substantially parallel and are pivoted on pivots, the axes 38 and 39 of which are perpendicular to a vertical plane, extending transversely of the vehicle. At their opposite ends the arms are pivotally connected by pivots, the axes 41 and 42 of which are parallel to one another and to the axes 38 and 39, to a yoke member 43. The pivot axes 41 and 42 are spaced apart substantially the same distance that the axes 38 and 39 are spaced apart, and extend parallel therewith, so that a plane containing the axes 41 and 42, when the arms are in any selected position, will lie parallel to all other planes containing the axes 41 and 42 as the arms 35, 36, swing up and down in a vertical plane to different positions.

Figure 5:
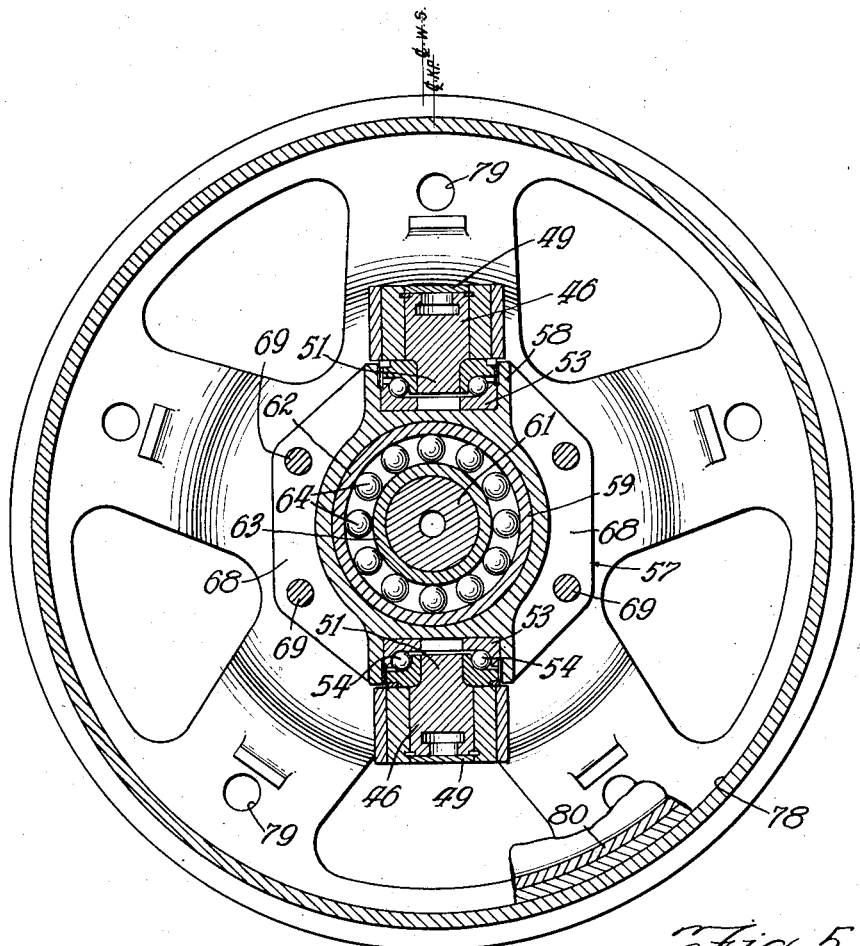
Fig. 5 is a section taken substantially along the line V—V of Fig. 2 and on the scale thereof.

The yoke member 43 has forked arms 44, each of which carries a fixed bushing 45, within which a king or trunnion pin is disposed and fixed and held against displacement by a snap ring 47 engaged in an undercut slot 48 in the bushing, while a welch plug 49, may be used to close the outer end of the bushing. Each king or trunnion pin 46 has a reduced inner end portion 51, on which one race member 52 of a bearing is mounted, the other race member 53 being carried by a part of the wheel hub structure. Balls 54 roll in the races and the bearings are of the sealed-lubricant type closed by sheet metal rings 55 and 56. A wheel hub member of cast steel 57, the formation of which is best illustrated in Fig. 5, is provided with vertically spaced wells or recesses, the walls of which are designated 58, within which the bearing members 53 are disposed, and it has a transversely extending central cylindrical portion 59, within which the wheel spindle 61, and the wheel spindle bearings, including outer race 62, inner race 63, and balls 64, are carried. The wheel spindle has a shouldered flange 65, which is drilled and tapped at suitable places for the reception of stud bolts 66, with which the brake drum member 67 is attached to the spindle. The hub member 57 also carries forwardly and rearwardly extending flanges 68, which are suitably drilled and tapped for the reception of bolts 69, by which a drum backing plate 71 is secured thereto. A spindle arm 72 is also secured to the casting 57 by the rearwardly extending flange 68 thereof and by means of one pair of the bolts 69.

The spindle bearing race member 62 is held in place in the hub member 57 by wedging snap rings 73 and 74, which engage in circumferential recesses or grooves provided in the casting 57 and press against the ends of the race member. The wheel spindle 61 has a circumferential shoulder 75, against which one end of race member 63 abuts and which positions the spindle with respect to the spindle bearing, while a wedging snap ring 76, engaged in a circumferential recess or groove formed in the inner end of the spindle and pressing against race member 63, serves to secure the spindle within the bearing with the bearing race member 63, abutted against the shoulder 75. Dust caps 77 of sheet metal and having a friction fit with the respective parts with which they are shown to be engaged, may be utilized to protect the spindle bearing.

Figure 2:
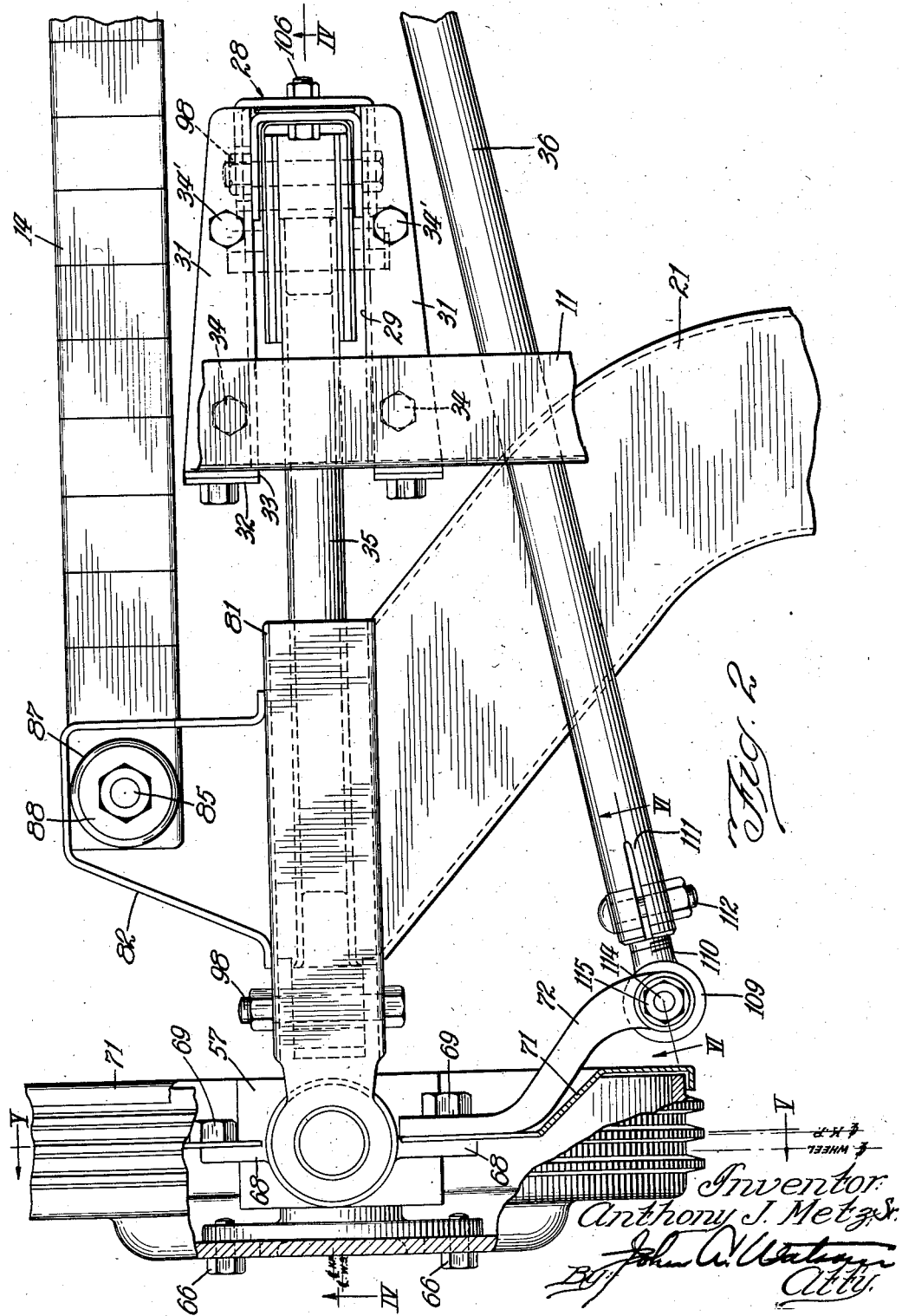
Fig. 2 is a top plan view on a larger scale than the scale of Fig. 1, of the upper left hand corner portion of the mechanism illustrated in Fig. 1.
Figure 3:
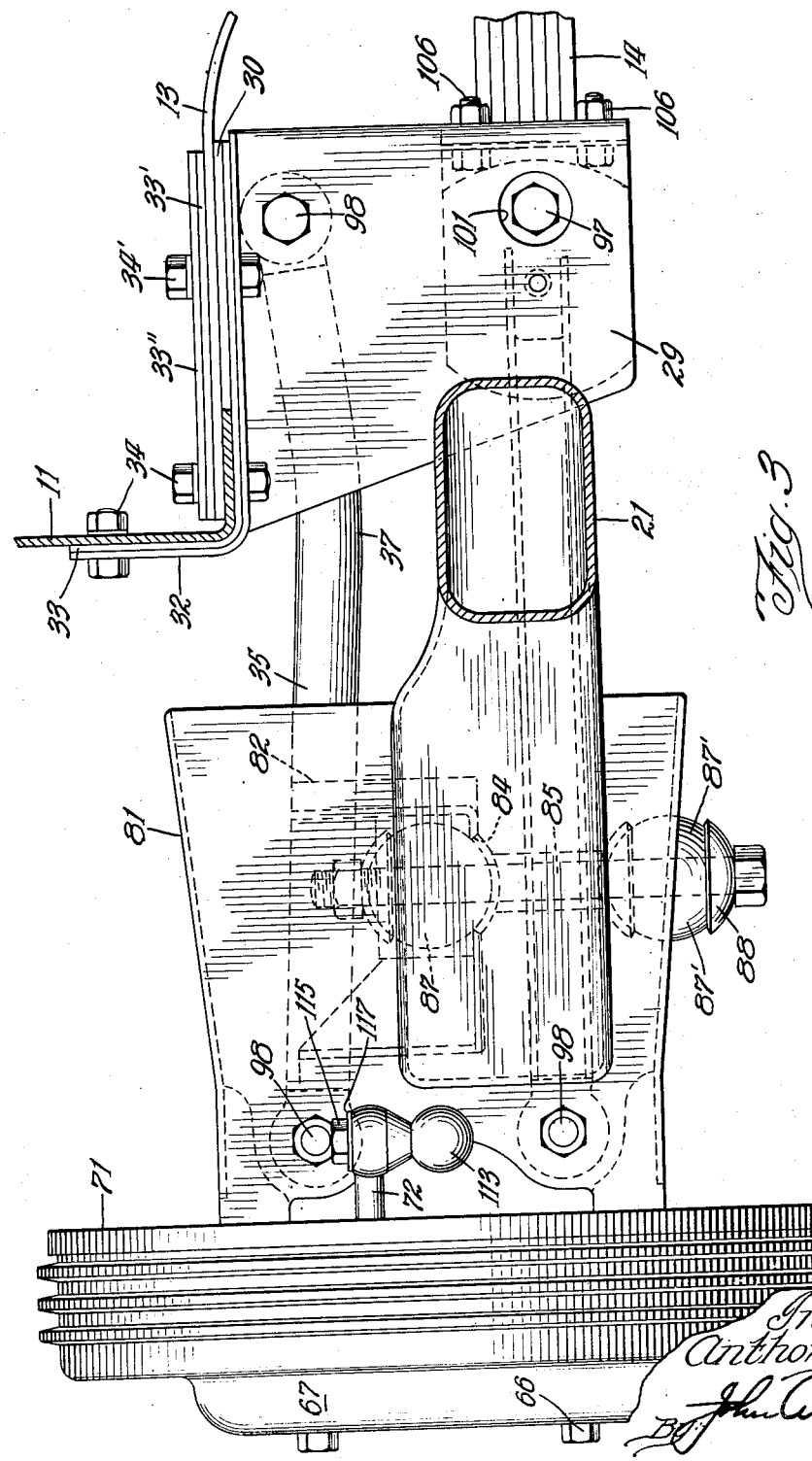
Fig. 3 is a rear elevation of the mechanism shown in Fig. 2 and to the scale of the latter.
Figure 4:
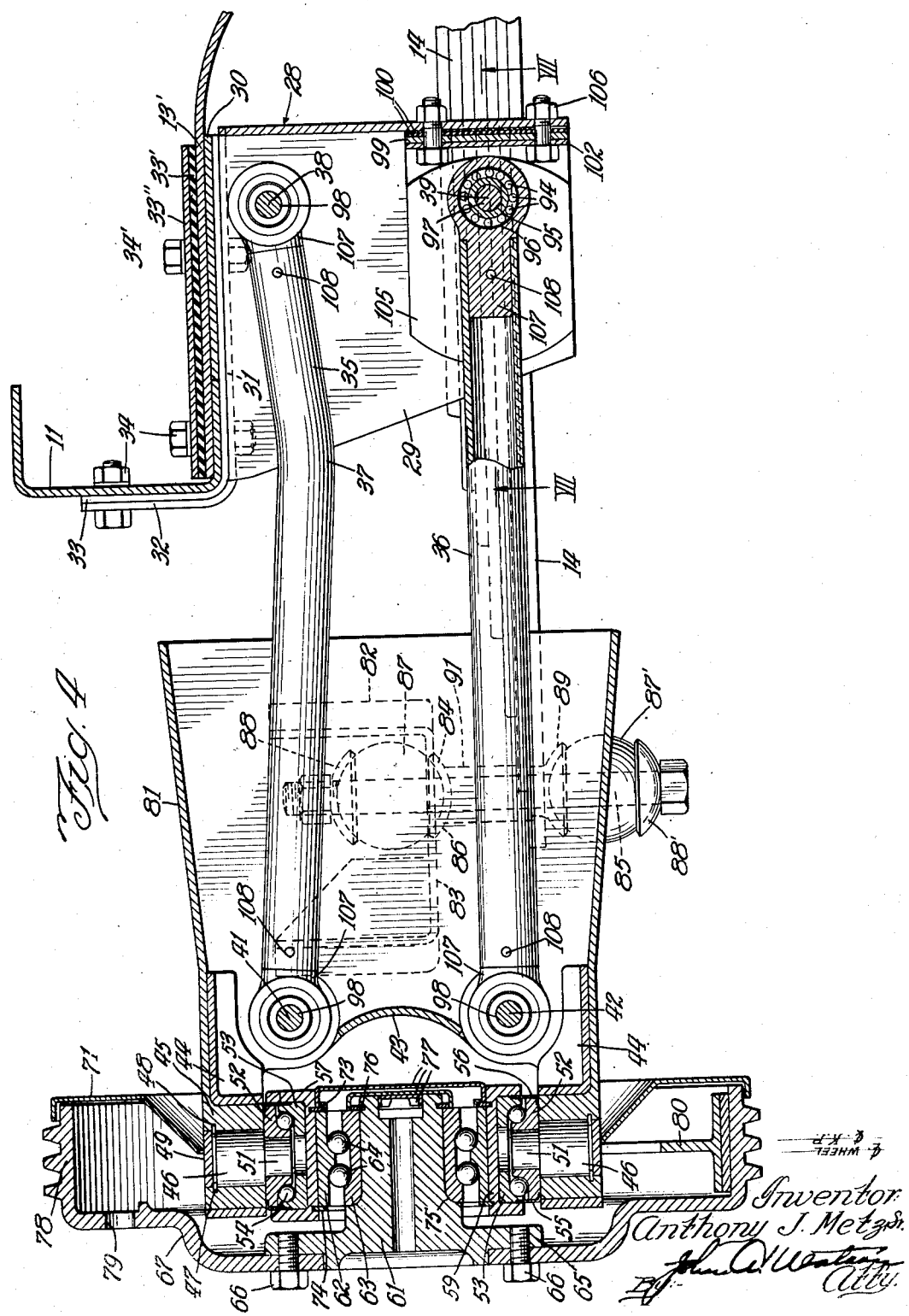
Fig. 4 is a view with some parts in vertical section taken along the section line IV—IV of Fig. 2 looking forward, and on the same scale as Figs. 2 and 3.

While the wheel has a certain amount of caster, as will be described, it has no initial camber or toe-in. The king or trunnion pins 46 have a common axis which lies in a vertical plane which may be parallel to the planes containing the pivot axes 38, 39, and 41, 42, and this common axis is also perpendicular to the normal horizontal plane of the vehicle chassis. The axis of the spindle 61 and spindle bearings is perpendicular to the vertical planes containing the pivot axes 38, 39 and 41, 42, but lies slightly rearward (about 1/8" in a full size construction) of the common axis of the king or trunnion pins, as indicated by the legends designating the center line of the spindle and center line of the trunnions on Figs. 2 and 5 of the drawings. The mean plane of rotation of the wheel, as indicated by the legend "C wheel" in Fig. 2 is disposed slightly outward of (about 1/4" in the full size construction mentioned, supra) and parallel to a longitudinally extending plane containing the common axis of the king pins or trunnions when the wheel is running straight ahead, while the flange 78 of the brake drum extends substantially equal distances to each side of the said plane containing the common axis of the king pins thereby balancing the braking efforts and preventing the wheel from 'ducking' to one side or the other. The wheel proper, of course, may be attached to the brake drum member 67 by means of bolts which pass through the wheel spoke or disc structure into suitably disposed and tapped openings 79 formed in the drum member 67. The disposition of the axis of the wheel spindle rearwardly of the common axis of the king or trunnion pins is sufficient to provide the necessary caster, and the disposition of the center of tread or central plane of rotation of the wheel slightly outward of a parallel longitudinal plane containing the common axis of the king or trunnion pins produces or tends to produce a certain stability, as will be understood by those skilled in the art. While a brake shoe 80 with its attached lining are shown in Figs. 4 and 5, no attempt has been made to illustrate any other parts of the wheel brake mechanism which form no part of the present invention.

The yoke member 43 is rigidly and more or less integrally connected, as by welding, with a box skirt or housing member 81 the walls of which are spaced sufficiently far from the parallel link arms 35 and 36 as to avoid them during maximum relative vertical movements, but close enough to afford a certain amount of protection to the parts surrounded. However member 81 serves other functions, for, among other things, it supports a forwardly extending bracket 82 upon and to which one end of spring 14 is seated and secured, and it serves as an anchorage or abutment for the forward end of the torque, thrust or radius rod 21, the member 81 and rod 21 being welded or otherwise rigidly and, in effect, integrally secured together.

The bracket 82 which may also be welded to member 81, has a bottom wall 83 which is apertured as at 84 for passage of an anchor bolt 85. Portions of the wall 83 are depressed as at 86 around the aperture or slot 84 to provide a spherical seat for a resilient (rubber or composition) ball 87 which surrounds the upper portion of the stem of bolt 85 and is capped by a metal cap 88. The lower end of the bolt 85 passes through an aperture in the end of the spring 14 and like the upper end is equipped with a resilient ball 87' held between a metal cap 88' and a spherical socket 89 seated against the spring leaf at the bolt aperture or within the aperture. A spacer bushing 91 serves to hold the spring and bracket wall 83 in proper relationship. As will be appreciated, the spring may be secured to member 81 in other ways although the arrangement shown and described has been found to be desirable in actual constructions.

The radius or torque rod or arm 21 is of box section and may be formed of relatively heavy gauge sheet steel bent to box section and welded. It may be formed integral with the skirt or housing member 81, rather than separately therefrom and welded thereto. In longitudinal side elevation it may be straight dipping slightly to clear the adjacent tie-rod although the section decreases in all overall dimensions to its rear end at which place it may be equipped with a ball (not shown) to make, substantially, a universal joint with a socket formed in a bracket 92 and a cap 93. The bracket 92 may be secured to one of the longitudinal frame members 11 and 12 as indicated in Fig. 1. It will be noted that each of the radius rods at its front end extends over a substantial transverse area which includes areas closely adjacent to the pivots 41 and 42, to the common axes of the trunnions and to the center of the wheel spindle bearing, and that it is disposed almost directly rearward of the spring connection with the brackets 82. In longitudinal plan each radius rod is curved inwardly of the chassis for a short distance at its front end to provide clearance for the front wheels as they are turned in steering, but returns outward and rearward to the ball and socket joint with the brackets 92 on frame member 11 or 12. Preferably the center of the ball and socket joint between a radius rod and a bracket 92 lies substantially in longitudinal alignment in plan with the center line or axis of the trunnions and substantially in longitudinal alignment in elevation with the center of the wheel spindle and bearing under normal conditions. The radius rods should be of substantial length as indicated in the drawings and in no event should be less than twice and, preferably, thrice the mean length of the parallel arms or links 35, 36 between the pivot centers thereof. In practice the radius rods should be just as long as is commercially expedient.

Each of the parallel arm pivots of which the axes are numbered 38, 39, 41, and 42, is preferably constructed with needle bearings as represented in the lower right hand portion of Fig. 4, wherein needles 94 are disposed between hardened spaced bearing sleeves or bushings 95 and 96. The sleeves 95 surround pivot bolts 97 and 98 and serve as spacers as will be understood; however the bolts 97 pass through the arms of a yoke member 99 and through enlarged apertures or slots 101 in flanges 29. Within the yoke member 99 is a steel (tempered) spring 102 of yoke shape to the arms of which resistance or friction plates 103 composed of brake lining fabric or the like are secured as by rivets 104. The arms of spring 102 are given an initial set toward one another thereby to bring the plates 103 into tight frictional engagement with hard flat steel wear plates 105 which are welded or otherwise rigidly secured to opposite sides of the arms or links 36. One or more bolts or screws 106 pass through the back of yoke bracket 28, one or more rubber, fiber or other resilient pads 100, serving as spacing and as shock and sound absorbent means, the yoke member 99, and the spring 102 and being suitably attached to or associated with either the spring and member 99 and bracket 28, may be rotated to adjust the member 99, the spring 102 and the link 36 toward or from the back of yoke bracket 28, thereby to vary the wheel position. By varying the number and thickness of pads 100, various adjustments may be obtained. The wheels and their associated mechanisms are illustrated in positions of normal vehicle loading and adjustment but due to wear and practical construction difficulties, the adjustment provided by the screws 106 may be needed to set the wheels in such positions that their planes of rotation are vertical. Since the arms 36 are of tubular construction the ends are provided with pivot eye members 107 secured by rivets 108.

Figure 6:
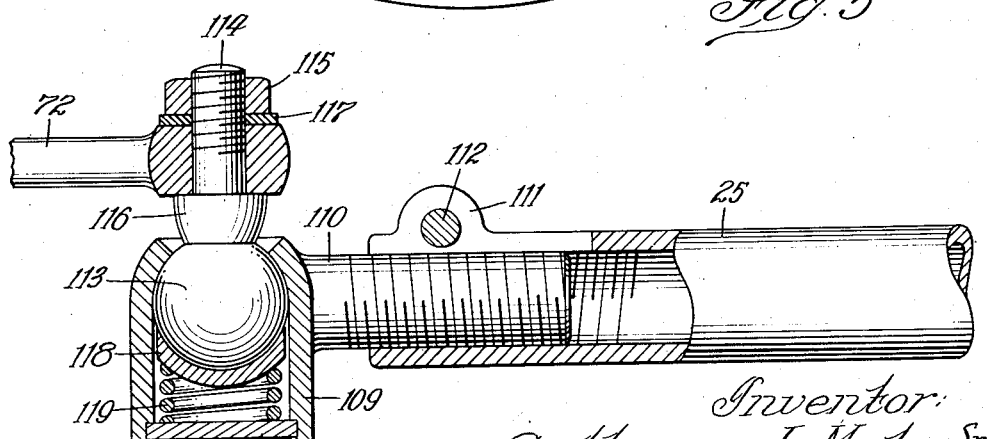
Fig. 6 is a vertical section of details of connection between a tie-rod and a spindle arm, taken substantially along section line VI—VI of Fig. 2 but on a larger scale.

The tie rods 25 are of tubular construction as shown in Fig. 6 and are adjustably secured to universal joint socket members 109, split ends 111 having internal threads for engagement with similar threads on the stem 110 of socket member 109 and being clamped thereto by clamp screws 112. Each socket is adapted to receive a ball 113 carrying a stem 114 which passes through the spindle arm 72 and is held thereto by a nut 115 between a conical washer 116 and a flat washer 117. A spherical bearing cap or washer 118 backed by a spring 119 which is compressed between a plug 121 and cap 118, serves to hold the ball 103 in relatively tight frictional engagement with the socket bearing surfaces. The joints or connections between the tie rods 25 and the swinging arm 24, the joint between the arm 24 and drag link 27 and the joint between the drag link 27 and pitman or steering arm 26 may all be constructed after the manner of the joints between the spindle arms and the tie rods, as just described.

The arrangement and operation of the steering mechanism are similar to the arrangement and operation of the steering mechanism of the aforesaid copending application Serial No. 140,463 as above noted, except that the tie-rods are independently connected with the arm 24 instead of being jointly connected by a single pivot connection. The relative positions or locations of connections may be considered to be the same. The steering arrangements and operation will be explained herein by reference to Figs. 9 and 10 which diagrammatically illustrate the angles through which the inside wheel will turn for given increments of angular change in the outside wheel in making a turn with a vehicle having a certain wheel base and a certain transverse wheel span, using the mechanism illustrated, thereby to maintain intersection of the dirigible wheel axes substantially on the common axis of the rear or fixed wheels or intersection of the dirigible wheel axes with a perpendicular line in a perpendicular or vertical plane containing the common axis of the rear or fixed wheels. To this end Fig. 9 diagrams a vehicle having a wheel base of 125 inches and a wheel span (tire tread center to tire tread center with the wheels parallel for straight ahead running) of 57 inches. In such case with the angle A known (assumed) the angles B, C, D, E, and F and the distances $a$ and $b$, may be figured trigonometrically, as will be apparent, so that by assuming or assigning different values to the angle A, the exact corresponding angles F may be computed, thus determining the exact differential turning movements of the inside wheel to maintain the intersection of projections of the axes of the dirigible wheels on the projection of the common axis of the fixed or non-dirigible wheels.

Applying the required formulae to the instant construction and utilizing a length of 5¾ inches for the bracket 23 between the line of axes of the wheel spindles 61 and the center or axis of pivot 24a and a radius length of 4⅞ inches for the swinging arm 24 between pivot center 24a and the centers of pivotal connections of tie rods 25 to arm 24, the angles A to F' inclusive and the distances $a$ and $b$ will be as given in the chart immediately following this paragraph. It is to be understood that the angles are given in degrees and minutes while the distances are given in inches. In order to show how closely the illustrated embodiment, with the dimensions given, will cause the inside wheel to move through the correct angle for each increment of angular movement A of the outside wheel, the extreme right hand column of the chart gives the theoretically or ideally correct angle F for corresponding angles A.

| A | B | $a$ | C | $b$ | D | E | F' on layout | F |
|---|---|---|---|---|---|---|---|---|
| 5° | 85° | 1,430 | 5° | 1,373 | 84° 48' | 12' | 4° 54' | 5° 12' |
| 10° | 80° | 710 | 10° | 653 | 79° 10' | 50' | 10° 6' | 10° 50' |
| 15° | 75° | 467 | 15° | 410 | 73° 1' | 1° 59' | 15° 18' | 16° 59' |
| 20° | 70° | 343.5 | 20° | 286.5 | 66° 25' | 3° 35' | 21° 11' | 23° 35' |
| 25° | 65° | 268.2 | 25° | 211.2 | 59° 24' | 5° 36' | 29° 23' | 30° 36' |
| 30° | 60° | 216.5 | 30° | 159.5 | 51° 54' | 8° 6' | 36° 42' | 38° 6' |
| 31° 14' | 58° 46' | 206 | 31° 14' | 149 | 50° | 8° 46' | 39° 16' | 40° |

The distance between the centers of pivotal connection 20, 20 (see Figs. 1 and 10) of the tie rods with the swinging arm 24 plays some part in the steering geometry but for the purposes of this application disclosure is relatively unimportant and has been neglected in the computations of the figures of columns F and F' of the above chart. In an actual embodiment of the invention utilizing the dimensions given, this distance is 1¾ inches while each tie rod length between pivot centers is approximately 25 1/16 inches and each spindle arm length measured as the shortest distance from the center of its pivotal connection with the tie rod to the trunnion axes is 6½ inches.

The operation of the described mechanisms is relatively simple. With the vehicle running straight ahead, should either wheel or both wheels strike a depression the wheel or wheels will drop while the vehicle body and other parts because of inertia and other effects tend to continue at the same level but each wheel, in dropping, will continue in planes of rotation which are parallel to its previous plane of rotation and parallel to one another. This action of course follows from the action of the parallel arms or links 35 and 36. Similarly the wheels rise on striking an abrupt rise in a road surface, maintaining parallel planes of rotation.

Owing to the fact that the common axis of the trunnions or king pins is practically centered with respect to the central or mean plane of rotation of the wheel, being offset inwardly by about ¼ of an inch in the embodiment mentioned, and to the fact that the trunnion axes are substantially perpendicular at all times to a normal or mean horizontal plane of the vehicle, braking forces and forces against the wheel in its course of travel are carried directly rearward and absorbed or dissipated with little transmission to the steering wheel, and the gyroscopic forces of the rotating parts do not fight against the steering mechanism. Not only are such forces received at zero or substantially zero leverages but the elimination of stub axles and connections between the links 35 and 36 with the trunnion carrying member and between the spring end and the pivot axes 41 and 42, and the location and arrangement of the radius rod, on each side of the vehicle, reduce the ordinary bearing loadings to a point where the steering ratios may be cut substantially in half for the same control effort. Furthermore the composite construction gives a relatively high control safety factor since most of the forces produced are absorbed without entering the steering linkage so that, as in actual tests, a tire may be driven on while flat or may blow or the car may be driven over a high curb or the like, at high speed without relative danger.

In the design of a construction for independently mounting vehicle wheels, if the component parts are such as to establish frequencies of functioning substantially equivalent to the frequencies of the spring arrangements, no exterior means, such as a shock absorber, is necessary as a component part of the mechanism because the function of the shock absorber is to bring to rest unbalanced or undamped forces which are incident to the operation of an unbalanced mechanism. This relation of parts in the present embodiment of the invention is established by making the torque radius rods or longitudinal control members as long as possible so that the frequency of functioning of such members will be as low as possible, and so that each will function as an entirety and with its adjacent wheel, more as a weight effect rather than as controlling the periodicity of functioning as does a pendulum in a clock mechanism.

This wheel mass and that portion of the weight of the torque radius rod which may be considered a part of the wheel mass has a definite frequency which is a matter related to mass, tire size and amount of air pressure of the tire, and the car spring also, by design, has an established frequency of functioning similar to a tuning fork. By making the length of the parallelogram linkage (35 and 36) of proper length a correlated frequency of functioning is established. For instance, in the case of the aforesaid embodiment in a car having a wheel base of 123 to 125 inches it has been found that a very effective and satisfactory control for the wheel mass and wheel size is provided when the parallelogram length in the embodiment described, may be from 14 to 16 inches depending upon wheel mass effect, and the length of the torque radius arm is approximately 44 to 45 inches between the axes of the trunnions and the center of the torque radius arm or rod rear pivot, measured along a perpendicular to transversely extending parallel perpendicular planes passing through said pivot center and containing said trunnion axes. Under these conditions the frequencies of operation are correlated so that under all normal operating speeds, (speeds in excess of 25 m. p. h.) no undamped forces of any magnitude are felt in the operation of the mechanism.

In résumé of the construction described it may be well to note that (1) the king pins or trunnions are substantially on the center lines of the wheels and are displaced laterally therefrom for stability and forwardly for an optimum caster effect, (2) longitudinal stability of wheel location is established by the torque or radius arms while transverse stability is obtained and maintained by the parallelograms, (3) the caster is at substantially an optimum at ⅛", (4) the wheel toe-in is normally zero, (5) the wheels are without camber which is zero, (6) the arrangement of the spindle arms, the tie rods, the swinging arm 24 and the several pivots and connections thereof give substantially correct, and, for practical purposes, correct steering geometry, and (8) there is what may be termed synchronous balance of operative reaction forces which is obtained by the frequency control established by the parallelogram length, the spring frequencies, the character, arrangement and location of the radius torque rods, the load point of application and an actual reaction frequency of unsprung weight. Of course the construction described gives many other advantages including low manufacturing and maintenance costs as will be obvious.

When a transverse elliptic spring is or semielliptic springs are used, cross stabilization is secured without the use of auxiliary devices, and the center of roll of the vehicle is changed so that centrifugal forces (as when rounding a curve) are minimized insofar as undesirable effects are concerned and the forces are resolved at a place more nearly approaching the center of gravity, thus making it possible to take a given curve faster than with a conventional design, with the same factor of safety. Another feature of the design lies in the fact that the rate of recovery from road shocks may be as great as approximately sixteen times that of the ordinary design, which increase in rate gives a much increased period of road contact for the tires. In this connection it may be noted that the shock absorbers or motion damping means on the inner ends of the lower parallelogram arms or links serve their primary purpose at low speeds and over minor variations of surface smoothness of the road and become decreasingly effective as the vehicle speed increases or as the magnitude of road surface irregularities increases. At higher speeds and with road irregularities of substantial size the inertia of the sprung mass of the vehicle and the relatively synchronous balance of the mechanisms described, make shock absorbers and shock absorber action wholly unnecessary.

A preferred form of the invention has been shown and described for the purpose of illustration and by way of example only and is not to be considered as limiting the invention which may assume various embodiments within its purview and the scope of the following claims.

I claim:

1. In a vehicle front end construction in combination, a frame member, a pair of substantially parallel arms pivotally connected at one end of each with said frame member on pivot axes spaced apart in a substantially vertical plane extending longitudinally of the vehicle, a rotatable wheel member, a hub member, a substantially horizontal spindle carried by said wheel member and disposed in said hub member, bearings between said hub member and spindle for the rotation of said spindle about its axis, a rearwardly extending radius rod, a pair of vertically spaced and coaxial trunnions, means carrying said trunnions and relatively rigid with said radius rod said trunnions being associated with said hub member radially outward of said bearings for oscillation of said wheel member about the axes of the trunnions, and means pivotally connecting the other ends of said parallel arms with said trunnion carrying means on pivot axes spaced apart in a plane substantially parallel to the plane containing the pivot axes of the first said ends of the arms.

2. In a vehicle front end construction in combination, a frame member, a pair of substantially parallel arms pivotally connected at one end of each with said frame member on pivot axes spaced apart in a substantially vertical plane extending longitudinally of the vehicle, a rotatable wheel member, a substantially horizontal spindle carried by said member, a hub member, bearings between hub member and spindle for the rotation of said spindle about its axis, a longitudinally extending radius rod, means carrying a pair of vertically spaced and coaxial trunnions, said trunnion carrying means being relatively rigidly associated with said radius rod and also associated with said hub member radially outward of said bearings for oscillation of said wheel member about the axes of the trunnions, means pivotally connecting the other ends of said parallel arms with said trunnion carrying means on pivot axes spaced apart in a plane substantially parallel to the plane containing the pivot axes of the first said ends of the arms, and motion damping means including a portion carried by one of said parallel arms.

3. In a vehicle front end construction in combination, a frame member, a pair of substantially parallel arms pivotally connected at one end of each with said frame member on pivot axes spaced apart in a substantially vertical plane extending longitudinally of the vehicle, a rotatable wheel member, a hub member, a substantially horizontal spindle secured to said wheel member and disposed in said hub member, bearings between said hub and spindle members for the rotation of said spindle about its axis, a longitudinally extending radius rod, means rigidly secured to said radius rod and carrying a pair of vertically spaced and coaxial trunnions, said trunnions being associated with said hub member radially outward of said bearings for oscillation of said wheel member about the axes of the trunnions, means pivotally connecting the other ends of said parallel arms to said trunnion carrying means on pivot axes spaced apart in a plane substantially parallel to the plane containing the pivot axes of the first said ends of the arms, and motion damping means operatively associated with the frame and the frame connected end portion of one of said parallel arms.

4. In a dirigible wheel assembly for a vehicle, a frame, a pair of substantially parallel arms of substantially equal length extending substantially transversely of the vehicle and pivotally connected at one end of each with said frame for swinging movements in a substantially vertical plane, means pivotally connecting the other ends of said arms in spaced relation for relative movements therebetween in a substantially vertical plane, a pair of vertically spaced trunnions carried by said connecting means, the axes of said trunnions being substantially coaxial with one another and being perpendicular to a horizontal plane, a hub member mounted between said trunnions for pivotal movements thereon and with respect thereto, a wheel spindle rotatably disposed in said hub member between said trunnions, said spindle having a horizontal axis located rearwardly of the line of axes of the trunnions, and a rod secured to said connecting means and extending rearward therefrom substantially parallel to the longitudinal axis of the frame, said rod being so constructed and disposed as to resolve forces applied at the front end thereof into forces thrusting rearwardly parallel to said frame.

5. In a dirigible wheel assembly for a vehicle, a frame member, a pair of substantially parallel arms of substantially equal length extending substantially transversely of the vehicle and pivotally connected at one end of each with said frame member for swinging movements in a substantially vertical plane, a pair of vertically spaced trunnions, means pivotally connecting the other ends of said arms in spaced relation with said trunnions for relative movements therebetween in a substantially vertical plane, the axes of said trunnions being substantially coaxial with one another and being perpendicular to a horizontal plane, a wheel spindle rotatably disposed between said trunnions, said spindle having a horizontal axis located rearwardly of the line of axes of the trunnions, and a radius rod connected at one end to the said means and at its other end to said frame at a place substantially in line with the center of rearwardly thrusting forces which may be exerted against said spindle.

6. In a dirigible wheel asembly for a vehicle, a frame, wheel locating means at each side of said frame, each locating means comprising, a pair of relatively nonresilient and substantially parallel arms of substantially equal length extending substantially transversely of the vehicle and pivotally connected at one end of each with said frame for swinging movements in a substantially vertical plane, a pair of vertically spaced trunnions, means pivotally connecting the other ends of said arms in spaced relation with said trunnions for relative movements therebetween in a substantially vertical plane, the axes of said trunnions being substantially coaxial with one another and being perpendicular to a horizontal plane, a wheel member including a spindle rotatably disposed between said trunnions, said spindle having a horizontal axis located rearwardly of the line of axes of the trunnions, a bracket non-rotatably carried by each locating means adjacent to its wheel member and forward of the line of spindle axes, and a spring secured at a center portion to said frame and at its ends to said brackets.

7. In a dirigible wheel assembly for a vehicle, a frame, wheel locating means at each side of said frame, each locating means comprising, a pair of substantially parallel arms of substantially equal length extending substantially transversely of the vehicle and pivotally connected at one end of each with said frame for swinging movements in a substantially vertical plane, a pair of vertically spaced trunnions, means pivotally connecting the other ends of said arms in spaced relation with said trunnions for relative movements therebetween in a substantially vertical plane, the axes of said trunnions being substantially coaxial with one another and being perpendicular to a horizontal plane, and a wheel member including a spindle rotatably disposed between said trunnions, said spindle having a horizontal axis located rearwardly of the line of axes of the trunnions, a bracket non-rotatably carried by each locating means adjacent to its wheel member, a spring secured at a center portion to said frame and at its ends to said brackets, and a radius rod connected at one end with each of the first said means at a place substantially directly rearward of the end of the spring thereat and at its opposite end to said frame at a place substantially directly rearward of the wheel member and substantially in line with the center of rearward thrust on the wheel member when the wheel member is running straight ahead.

8. In a dirigible wheel assembly for a vehicle, a frame, wheel locating means at each side of said frame, each locating means comprising, a pair of substantially parallel arms of substantially equal length extending substantially transversely of the vehicle and pivotally connected at one end of each with said frame for swinging movements in a substantially vertical plane, a pair of vertically spaced trunnions, means pivotally connecting the other ends of said arms in spaced relation with said trunnions for relative movements therebetween in a substantially vertical plane, the axes of said trunnions being substantially coaxial with one another and being perpendicular to a horizontal plane, and a wheel spindle rotatably disposed between said trunnions, said spindle having a horizontal axis located rearwardly of the line of axes of the trunnions, a leaf spring between each of the trunnion and arm connecting means and said frame, and a radius rod rigidly secured at one end to each of said connecting means and pivotally secured at its other end to said frame at a place rearward of the connecting means, the center of the rear end of each radius rod lying substantially in a perpendicular plane containing the center of turning of the wheel immediately forward thereof when such wheel is running straight ahead.

9. In a vehicle wheel mounting construction, a hub member, a wheel spindle having a horizontal axis disposed within said hub member, spindle bearings between said spindle and said hub member, said hub member having a recess in the radially outer portion thereof at each of substantially opposite sides of the spindle axis, trunnion bearings disposed in said recesses for rotation in parallel horizontal planes and about a common axis perpendicular to a horizontal plane containing the axis of said spindle, said common axis lying ahead of the spindle axis in the direction of vehicle forward motion whereby to provide wheel caster, trunnion pins mounted in said trunnion bearings for rotation relative thereto on said common axis, a radius rod carrying said trunnion pins, a vehicle frame member, and means including parallel arms arrayed one above the other in a substantially vertical plane, pivotally connected at one end of each to said frame member and pivotally connected at the other end of each to said radius rod.

10. In a vehicle wheel mounting construction, a hub member, a wheel spindle rotatably mounted on a horizontal axis within said hub member, said hub member having a pair of oppositely directed recesses formed therein, one of said recesses being directed generally vertically downward away from the spindle and the other being directed generally vertically upward away from the spindle, trunnion bearings disposed in said recesses with their axes of rotation aligned with one another and extending perpendicular to the horizontal plane containing the axis of the spindle, the axes of rotation of said bearings being disposed ahead of said spindle axis in the direction of forward vehicle motion, trunnion members carried by said bearings and having axes of relative rotation coincident with the axes of the bearings, a rearwardly extending radius rod thrust member having forked arms with the arms secured to said trunnion members, a vehicle frame member, means connecting said radius rod member with said frame member at a place substantially in a vertical plane containing the axes of said trunnion members and extending longitudinally of the vehicle, and means including vertically spaced and parallel arms extending transversely of the vehicle and connecting said frame member and forked arm member for relative vertical movements therebetween.

11. In a vehicle wheel mounting construction, a hub member, a wheel spindle rotatably mounted on a horizontal axis within said hub member, a bearing member carried by said hub member above and a similar bearing member carried by said hub member below said spindle and intermediate the ends of the spindle, a trunnion member carried by each of said bearing members for relative rotation on aligned axes of rotation, the aligned axes of rotation extending substantially perpendicular to the horizontal plane containing the spindle axis, a yoke member having spaced arms straddling one end of said hub member with said arms engaging said trunnion members, a pair of links spaced apart and extending parallel to one another in a vertical plane containing the axes of said trunnions and extending transversely of the vehicle, one end of each link being pivotally connected with said yoke member adjacent to said spindle end, a skirt secured to said yoke member and disposed about and in spaced relation to portions of said pivoted ends of said links, a spring seat carried by said skirt, a frame member pivotally connected with each of the other ends of said links, and a radius rod extending rearwardly from and substantially integrally connected at one end to said skirt, the rearward end of said radius rod being pivotally secured to said frame member at a place substantially in longitudinal alignment with the axes of said trunnion members.

12. In a vehicle wheel mounting construction, a hub member, a wheel spindle rotatably mounted on a horizontal axis within said hub member, a bearing member carried by said hub member above and a similar bearing member carried by said hub member below said spindle intermediate the ends of the spindle, a trunnion member rotatably carried by each of said bearing members on aligned axes, said aligned axes extending substantially perpendicular to the horizontal plane containing the spindle axis, a yoke member having spaced arms straddling one end of said hub member and secured to said trunnion members, a pair of links spaced apart and extending parallel to one another in a substantially vertical plane extending generally transverse of the vehicle, one end of each link being pivotally connected with said yoke member adjacent to said spindle end, a brake drum carried by the other end of said spindle and overhanging said trunnions a substantially equal amount on each side thereof, a drum backing plate carried by said hub member, a housing member carried by said yoke member and surrounding a portion of the said pivoted ends of said links and in spaced relation thereto, and a spring seat carried by said housing portion forwardly of said links.

13. In the construction of the dirigible portion of a vehicle, a pair of wheels mounted for movements relative to one another in substantially parallel planes of rotation when running straight ahead, a frame structure, means mounting each of said wheels for turning about a substantially vertical axis, means providing a transverse connection between each wheel and said frame structure, and a radius rod associated with each of said transverse connecting means adjacent to the axis of turning of its related wheel and pivotally associated with said frame structure at a place rearward of and substantially in longitudinal alignment with the axis of turning of its related wheel.

14. In the construction of the dirigible portion of a vehicle, a pair of wheels, a frame structure, means including a pair of parallelogram mechanisms, one mechanism pivotally connecting one wheel with said frame structure at one side and the other connecting the other wheel at the other side of said frame structure for maintaining said wheels in substantially parallel planes of rotation when running straight ahead, means pivoting each wheel for lateral turning movements, and a longitudinally directed radius rod connected at its forward end with a portion of each of the first said means and extending rearwardly and secured to said frame structure at a place substantially in longitudinal alignment with said pivoting means of its related wheel.

15. In the construction of the dirigible portion of a vehicle, a pair of wheels, a non-rotating hub connecting part for each wheel, a frame structure between said wheels, a pair of parallelogram mechanisms, one mechanism pivotally connecting one wheel by a hub connecting part with said frame structure at one side and the other connecting the other wheel at the other side of said frame structure for maintaining said wheels in substantially parallel planes of rotation during vertical movements when the wheels are running straight ahead, means pivoting each wheel on a substantially vertical axis for lateral turning movements, a pair of rearwardly extending radius rod members, each of said members being substantially rigidly secured to one of said hub connecting parts at its forward end and pivotally secured at its rearward end to said frame structure at a place substantially in longitudinal alignment with the said vertical pivot axis of the corresponding wheel, and a semi-elliptical spring carried intermediate its ends by said frame structure and secured at its ends to said hub connecting parts at places adjacent to said wheels.

16. In a mounting for a wheel of a vehicle, a frame, a wheel member, a transverse stabilizing means for said wheel member including substantially parallel arms disposed one above the other transversely of the vehicle, said arms being pivotally connected at corresponding ends with said frame and with said stabilizing means, and a torque-radius control means operatively associated with said stabilizing means and wheel adjacent to said wheel member and extending toward the opposite end of the vehicle for longitudinal alignment of said wheel member, said torque-radius control means being of substantially greater length than said arms and having connection with said frame at a place substantially in line with the mean path of longitudinally directed forces applied against the wheel when running straight ahead.

17. In a vehicle dirigible wheel mounting, a frame structure, a wheel including a spindle and a substantially non-rotative hub member connected with said frame structure transversely of the vehicle, a wheel carrier including a substantially vertical pivot associated with said hub member about which said wheel may swing in steering movements, a brake drum associated with said spindle, said drum having a braking surface the center of the effective braking area of which is substantially in alignment with the axis of said pivot, and a longitudinally extending radius rod member substantially rigidly connected with said carrier means at its forward portion and flexibly secured to said frame structure at a rearward portion and at a place substantially in longitudinal alignment with said center of the effective braking area of the drum.

18. In a vehicle dirigible wheel mounting, a frame structure, a wheel including a spindle and a substantially non-rotative hub member connected with said frame structure transversely of the vehicle, a wheel carrier including a substantially vertical pivot associated with said hub member about which said wheel may swing in steering movements, a brake drum associated with said spindle, said drum having a braking surface the center of the effective braking area of which is substantially in alignment with the axis of said pivot, and a longitudinally extending radius rod member substantially rigidly connected with said carrier means at its forward portion and flexibly secured to said frame structure at a rearward portion and at a place substantially in longitudinal alignment with said center of the effective braking area of the drum, said transverse connection between said wheel and frame structure including substantially vertically spaced parallel arms pivotally connected at corresponding ends with said frame structure and with said wheel carrier closely adjacent to said vertical pivot.

19. In a vehicle wheel mounting arrangement, a frame structure, a wheel, means including parallel links of substantially equal span arranged in a substantially vertical plane and pivotally associated at one end of each with said frame structure and at the other end of each with said wheel whereby said wheel may move vertically relative to said frame structure, and a longitudinally extending member associated at one of its end portions with said means and at its opposite end portion with said frame structure at a place substantially remote from said wheel and substantially in alignment with the plane of rotation of said wheel, said longitudinally extending member being at least twice as long as the mean span of said links between the pivot centers of the ends thereof.

20. In a vehicle wheel mounting arrangement, a frame structure, a wheel, a wheel carrier member, a pair of parallel links connecting said frame structure and wheel carrier member, and a radius rod of substantially greater length than the mean length of said links substantially rigidly secured by one end portion to and extending longitudinally in the direction of the vehicle length from said carrier member, said radius rod at its other end portion being pivotally associated with said frame structure substantially in longitudinal alignment with the mean plane of rotation of said wheel.

21. In a vehicle wheel mounting arrangement, a frame structure, a wheel including a spindle therefor, a wheel carrier including a substantially vertical pivot about which the wheel may swing in steering movements, and a longitudinally extending radius rod member of substantial length substantially rigidly associated with said carrier means at its forward portion and pivotally connected at its rearward portion to said frame structure at a place substantially in longitudinal alignment with said vertical pivot.

22. In a vehicle wheel mounting, a rotatable wheel member, a non-rotatable hub member for said wheel member, a spindle secured to said wheel member and disposed in said hub member, bearings between said hub member and spindle, a frame member, a pair of relatively inflexible arms of substantially equal length disposed in spaced parallel array with one above the other and extending transversely of the vehicle between said frame and hub members, said arms being pivotally connected with said frame member at one end of each and pivotally associated at the other end of each with said hub member for vertical movements of said hub member relative to said frame member, and longitudinal stabilizing means pivotally associated with said hub member for lateral turning movements of the hub member relative thereto, said longitudinal means extending between said other ends of said arms and said frame member at a place a substantial distance from said hub member and connected with said frame member at said place.

ANTHONY J. METZ, Sr.